May 8, 1934.  A. B. MERRILL  1,958,092
STRIP RUBBER ARTICLE AND METHOD OF PRODUCING THE SAME
Filed March 10, 1932
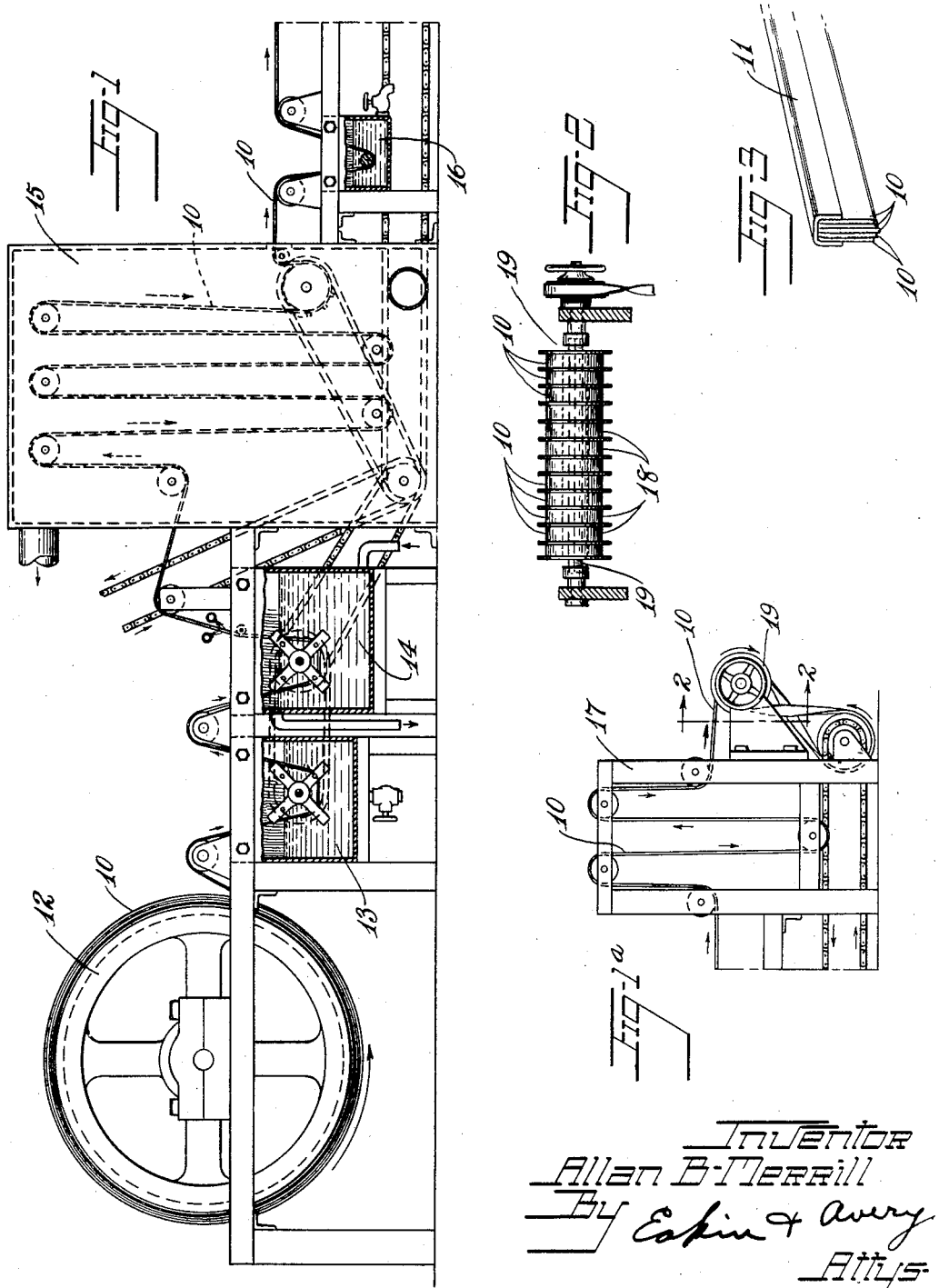

Patented May 8, 1934

1,958,092

UNITED STATES PATENT OFFICE 1,958,092

STRIP RUBBER ARTICLE AND METHOD OF PRODUCING THE SAME

Allan B. Merrill, Akron, Ohio, assignor to The B. F. Goodrich Company, New York, N. Y., a corporation of New York Application March 10, 1932, Serial No. 597,987

1 Claim. (Cl. 154—2)

This invention relates to the manufacture of such articles comprising strip rubber as the blades of windshield wipers for vehicles, and the invention pertains more particularly to the manufacture of the strip rubber in preparation for its assembly into the blade structure.

In the manufacture of wiper blades of the multi strip type it is highly desirable, if not essential, that the vulcanized rubber strips to be assembled in their side to side relation possess a slight tackiness at their contacting surfaces sufficient to cause the strips to adhere to one another with adequate tenacity when they are firmly pressed together, which conveniently may be done concurrently with the cutting of an assembly of superposed strips to length, to permit their being assembled with the metal backing of the wiper without becoming misaligned. At the same time, the tackiness should not be such as to cause permanent adhesion of the assembled strips, as freedom for separation at their windshield contacting edges is desired for effective functioning of the wiper, and also the material at the surface of the strips should not be such as to affect objectionably the wiping action or to leave a vision-marring deposit of blade material upon the windshield under the friction of operation. A further consideration is that the vulcanized strip rubber having the desired tackiness should be such that it may be conveniently rolled or otherwise packed, preferably in long length, for handling, storage and transportation prior to the blade assembly operation.

Although many expedients relating to this problem have heretofore been proposed, they have been for the most part unsuitable either because the proper small degree of tackiness has not been provided, the adhesion of the assembled strips being usually too small or too great, or the strips have been caused to smear the windshield.

The chief objects of the invention are to provide for satisfying to a high degree the above stated and other requirements in the production of such articles, and to provide for economy and facility of procedure and materials in the production of the articles.

These and further objects will be apparent from the following description, reference being had to the accompanying drawing in which:

Figs. 1 and 1a taken together are a side elevation of apparatus adapted for use in the procedure of the invention in its preferred form, parts of the apparatus being broken away.

Fig. 2 is a section on the line 2—2 of Fig. 1.

Fig. 3 is a perspective view of an end portion of an assembled wiper blade.

Referring to Fig. 3, the windshield wiper blade shown comprises a plurality of strips 10, 10 of resilient rubber composition held in assembled side to side relation by a metal clamping strip 11 gripping the strips along a margin thereof.

The procedure of assembling the rubber strips and attaching the metal backing may be greatly facilitated if the rubber strips possess sufficient tackiness to adhere to one another in their proper assembled relation during the metal crimping operation. This tackiness, however, should not be such as to prevent the free margins of the rubber strips from flexing independently during wiper operation, and the material of the strip surfaces should not deleteriously affect the wiping action or cause deposit of vision-marring substances upon the windshield.

In order to provide the surface of vulcanized strip rubber with these characteristics, the vulcanized strip, according to the invention, is coated on its side surface with an exceedingly thin layer of adhesive material, preferably by depositing upon the strip surface the desired small amount of the adhesive from a very dilute dispersion or solution of the latter in a volatile liquid.

For the adhesive a resinous, bituminous or other adhesive substance may be used, although it is preferred to use isomers of rubber from the natural, reclaimed or synthetic rubber substance. The adhesive is desirably one that is insoluble in water, so as not to become dislodged easily from the surface of the wiper strips and deposited upon the windshield by the action of rain water.

The liquid is preferably a volatile solvent such as benzol, gasoline, ethyl acetate, alcohol, etc., according to the adhesive used, and for the best results the strength of the solution should be quite low, preferably one percent or less, by weight. Good results have been obtained with the use of a .5 per cent solution of Pará rubber in benzol, gasoline or hexane or in mixtures of these liquids.

The coating may be effected by dipping the entire strip into the dilute solution and after removal permitting the solvent to evaporate. The small amount of adhesive material is thus uniformly deposited over the surface of the strip, and although it is sufficient to cause the strips to adhere with the desired tenacity when pressed together in their assembled relation for facility and accuracy of assembly with the metal backing of the wiper, the adhesive deposit is hardly perceptible to sight or touch and does not hinder the strips from separating freely at their windshield-contacting margins or in any other manner objectionably affect the wiping operation.

While I do not desire that the invention be restricted by any particular theory of operation, it may be stated that the successful results obtained by the procedure herein described are apparently due at least in part to the depositing of the solid constituents of the coating material, in their relatively small amount, in the minute irregularities existing in the surface of the rubber strip, especially if the latter has been vulcanized in contact with fabric, so that on pressing the strips together with sufficient force the tacky particles of each surface are caused to be pressed from the shelter of their crevices and to contact and adhere to one another, whereas on mere contact of the strip surfaces, without the required pressure, the tacky particles remain hidden in their crevices, and are not forced out into adhesive contact.

The strip rubber may be coated with facility by means of the apparatus shown in Figs. 1, 1a and 2, which, moreover, permits production of the strips in long length and reeling of the same in units for convenient handling and transportation.

A long length sheet of vulcanized rubber of the desired thickness is wound in a plurality of convolutions upon a drum 12 and is then cut circumferentially into a plurality of the strips 10, 10 of the desired width. Each strip is then fed from the drum through a cleaning bath 13, preferably of an alkaline solution, to remove dust, grease, sulphur bloom and other foreign substances, and then through a rinsing bath 14 of water, suitably driven pulleys, as shown, being provided to effect the feeding.

The strip is then fed through a drier 15 and in its cleaned and dried condition is passed through a coating bath 16 of a dilute adhesive solution for the purpose hereinbefore explained. After being coated, the strip is fed through a festoon rack 17 to permit evaporation of the solvent, and the strip with its very thin coating of adhesive is temporarily wound into one of the several rolls 18 of the reeling device 19. The apparatus permits a continuous procedure and facilitates the treatment of a plurality of strips at the same time.

From the rolls 18 the coated strips may be conveniently fed and cut into the desired short lengths for assembly into the multi-strip wiper blades. When the strips are pressed together in assembled side to side relation the slight tackiness provided by the coating prevents misalignment of the strips during the operation of crimping on the metal backing, without however causing undesirable adhesion at the free margins of the blade strips and without objectionably affecting the windshield wiping function of the strips.

Although the strip rubber may be coated only on the marginal surfaces to be clamped together, where permanent adhesion is permissible and desirable, the procedure of the invention permits use of the more convenient operation of applying the adhesive over the entire surface of the strip, as above described, with attainment of the desired objects.

Variations may be made without departing from the scope of the invention as it is defined in the following claim.

I claim:

The method of making a multistrip windshield wiper blade which comprises coating vulcanized strip rubber with a deposit from a dilute dispersion of rubber in a volatile solvent to make the strip only slightly adhesive, pressing together in side by side relation a plurality of strips of the coated rubber, and securing the strips along one margin of the assembly, thereby permitting independent flexing of the strips, the adhesive deposit being of such weakness as not to adhere the strips together permanently.

ALLAN B. MERRILL.